(12) United States Patent
Lee

(10) Patent No.: US 9,475,163 B1
(45) Date of Patent: Oct. 25, 2016

(54) LATHE WITH AUTOMATIC CROSS FEEDING AND RETRACTION FUNCTIONS

(71) Applicant: Chi-Nan Lee, Taichung (TW)

(72) Inventor: Chi-Nan Lee, Taichung (TW)

(\*) Notice: Subject to any disclaimer, the term of this patent is extended or adjusted under 35 U.S.C. 154(b) by 0 days.

(21) Appl. No.: 14/707,176

(22) Filed: May 8, 2015

(51) Int. Cl.
| | |
|---|---|
| *B23Q 5/00* | (2006.01) |
| *B23Q 5/28* | (2006.01) |
| *B23Q 5/52* | (2006.01) |
| *B23Q 15/013* | (2006.01) |

(52) U.S. Cl.
CPC . *B23Q 5/28* (2013.01); *B23Q 5/52* (2013.01); *B23Q 15/013* (2013.01)

(58) Field of Classification Search
CPC ............ B23Q 5/00; B23Q 5/22; B23Q 5/34; B23Q 5/36; B23Q 5/385; B23Q 5/40; B23Q 5/48
See application file for complete search history.

(56) References Cited

U.S. PATENT DOCUMENTS

| | | | | |
|---|---|---|---|---|
| 2,389,757 A | * | 11/1945 | Bickel | B23Q 5/34 82/142 |
| 2,601,157 A | * | 6/1952 | LeLan | B23Q 5/36 60/368 |
| 3,167,656 A | * | 1/1965 | Toulmin, Jr. | B23Q 35/128 250/202 |
| 3,188,896 A | * | 6/1965 | Le Lan | B23K 7/004 409/85 |
| 3,289,061 A | * | 11/1966 | Stratman | B23Q 23/00 318/162 |
| 3,348,438 A | * | 10/1967 | George | B23Q 5/406 82/136 |
| 3,424,040 A | * | 1/1969 | Vetsch | B23Q 16/10 29/39 |
| 4,235,135 A | * | 11/1980 | McElroy | B23B 29/02 82/15 |
| 5,749,273 A | * | 5/1998 | Rimlinger, Jr. | B23Q 5/40 74/625 |

\* cited by examiner

*Primary Examiner* — Will Fridie, Jr.
(74) *Attorney, Agent, or Firm* — Alan D. Kamrath; Kamrath IP Lawfirm, P.A.

(57) ABSTRACT

A lathe includes a frame having a bed mounted on a top face of a base. A carriage includes a saddle movable relative to the frame along a rotational axis. A cross sliding board is movable relative to the saddle in a transverse direction perpendicular to the rotational axis. A cross feed screw received in the saddle is rotatable relative to the saddle about a first rotating axis to drive the cross sliding board to move in the transverse direction. A driven gear is mounted on the cross feed screw. The saddle further includes a servo motor having a driving shaft. A driving gear is mounted on the driving shaft. The driving gear is rotatable about a second rotating axis to drive the driven gear to rotate. The carriage includes a controller electrically connected to the servo motor to control rotation of the servo motor.

7 Claims, 14 Drawing Sheets

LATHE WITH AUTOMATIC CROSS FEEDING AND RETRACTION FUNCTIONS

BACKGROUND OF THE INVENTION

The present invention relates to a lather and, more particularly, to a lathe with automatic cross feeding and retraction functions.

A conventional lathe includes a sliding track mounted on a lathe body. A cutter base can translate along the sliding track. A cross sliding seat is mounted on the cutter base and is threadedly coupled to a transverse hand wheel with a screw rod. A user can rotate the transverse hand wheel to slide the cross sliding seat on the cutter base. A cutter fixing seat is mounted on the cross sliding seat for fixing a cutter. The cutter base further includes an operation table mounted on a side of lathe body. A rack is mounted parallel to and beside the sliding track. A translation hand wheel is mounted on the operation table and meshes with the rack. A guiding screw is mounted on the side of the lathe body. A half-nuts seat is mounted in the operation table and can be controlled by a thread cutting handle to provide a clutch function with the guiding screw. Furthermore, a thread cutting indicator is mounted to a side of the operation table and is connected to the guiding screw. A dial is provided on the thread cutting indicator to indicate the thread rotational angle. A micro switch is provided to a bottom of the operation table. A guiding rod is mounted to the side of the lathe body. At least one limiting ring is provided on the guiding rod to cooperate with the micro switch that can be set to define the start point and the end point of movement of the cutter base.

During thread cutting, a workpiece is fixed to a fixing mechanism on a driving shaft, and a cutter is fixed on the cutter fixing seat. The transverse hand wheel is rotated to slide the cross sliding seat on the cutter seat. The dial on the transverse hand wheel permits the user to record and adjust the amount of feeding. Furthermore, the thread cutting indicator indicates the scale of the thread rotational angle. The thread cutting handle is moved to engage the half-nuts seat with the guiding screw. The guiding screw is rotated to move the cutter seat and the cutter towards the workpiece, thereby proceeding with thread cutting on the workpiece.

When the cutter seat moves to a position in which the micro switch contacts with the limiting ring, the lathe automatically stops the processing movement. The user has to manually rotate the transverse hand wheel to move the cutter outwards for retraction purposes. Then, the translation hand wheel is manually rotated or driven by a motor to translate the cutter seat to the start point of processing. Next, the transverse hand wheel is rotated back to correspond to the angular position of the dial in the first processing, and the feed amount is increased. The above procedures are repeated several times to accomplish the thread cutting step by step.

However, to prevent failure of the thread cutting, the scale of the thread cutting indicator must be the same every time the half-nuts seat engages with the guiding screw. Manual operation is generally required in the operation of the above lathe, particularly in the thread cutting process, repeated manual procedures, including adjusting the feed amount, switching the thread cutting handle and the half-nuts seat to engage with or disengage from the guiding screw, manually retracting the cutter, etc., are carried out. Furthermore, the feed amount has to be recorded every time during processing to avoid excessive adjustment that could damage the cutter or the workpiece. Furthermore, during feeding of the cutter, the user must notice whether the angular position of the dial of the thread cutting indicator is the same. The whole processing process is troublesome and complicated.

Thus, a need exists for a novel lathe with automatic cross feeding and retraction functions to mitigate and/or obviate the above drawbacks.

BRIEF SUMMARY OF THE INVENTION

A lathe with automatic cross feeding and retraction functions according to the present invention includes a frame having a base and a bed. The bed is mounted on a top face of the base. The bed extends along a rotational axis of the lathe. A carriage includes a saddle and a cross sliding board. The saddle is movable on a top face of the bed relative to the frame along the rotational axis. The cross sliding board is movable on a top face of the saddle relative to the saddle in a transverse direction perpendicular to the rotational axis. A cross feed screw is received in the saddle and extends along a first rotating axis that extends in the transverse direction. The cross feed screw is rotatable relative to the saddle about the first rotating axis to drive the cross sliding board to move in the transverse direction relative to the saddle. A driven gear is mounted on and jointly rotatable with the cross feed screw. The saddle further includes a servo motor extending along a' second rotating axis. The servo motor includes a driving shaft extending along the second rotating axis. A driving gear is mounted on and jointly rotatable with the driving shaft. The driving gear is rotatable about the second rotating axis to drive the driven gear to rotate. The carriage includes a controller electrically connected to the servo motor. The controller can be operated to control the servo motor to rotate or stop.

The saddle can further include a middle shaft extending along a third rotating axis. First and second idle gears are mounted on and jointly rotatable with the middle shaft. The first idle gear meshes with the driving gear. The second idle gear meshes with the driven gear. The driving gear drives the driven gear to rotate through transmission by the first idle gear and the second idle gear.

The second rotating axis can be parallel to the rotational axis. The third rotating axis can be parallel to the first rotating axis and can intersect with the second rotating axis. The driven gear can be a spur gear. The driving gear can be a bevel gear. The first idle gear can be a bevel gear. The second idle gear can be a spur gear.

The carriage can include an apron connected to the saddle. The apron is located on a front side of the base. A half-nuts lever and an automatic feed control rod are mounted to a side of the apron opposite to the frame. The half-nuts lever is connected to a first fluidic pressure device configured for moving the half-nuts lever. The automatic feed control rod is connected to a second fluidic pressure device configured for moving the automatic feed control rod. The controller is electrically connected to the first fluidic pressure device and the second fluidic pressure device.

The lathe can further include a feed limit rod mounted to the front side of the base and extending along the rotational axis. The feed limit rod includes a first stop and a second block. The first stop and the second stop are movable relative to the feed limit rod along the rotational axis. A first limit switch and a second limit switch are connected to the apron. The first limit switch and the second limit switch are located between the first stop and the second stop. The controller is electrically connected to the first limit switch and the second limit switch.

Each of the first fluidic pressure device and the second fluidic pressure device can be a pneumatic cylinder.

The controller can be fixed to the top face of the saddle.

The present invention will become clearer in light of the following detailed description of illustrative embodiments of this invention described in connection with the drawings.

DETAILED DESCRIPTION OF THE INVENTION

Figure 1:
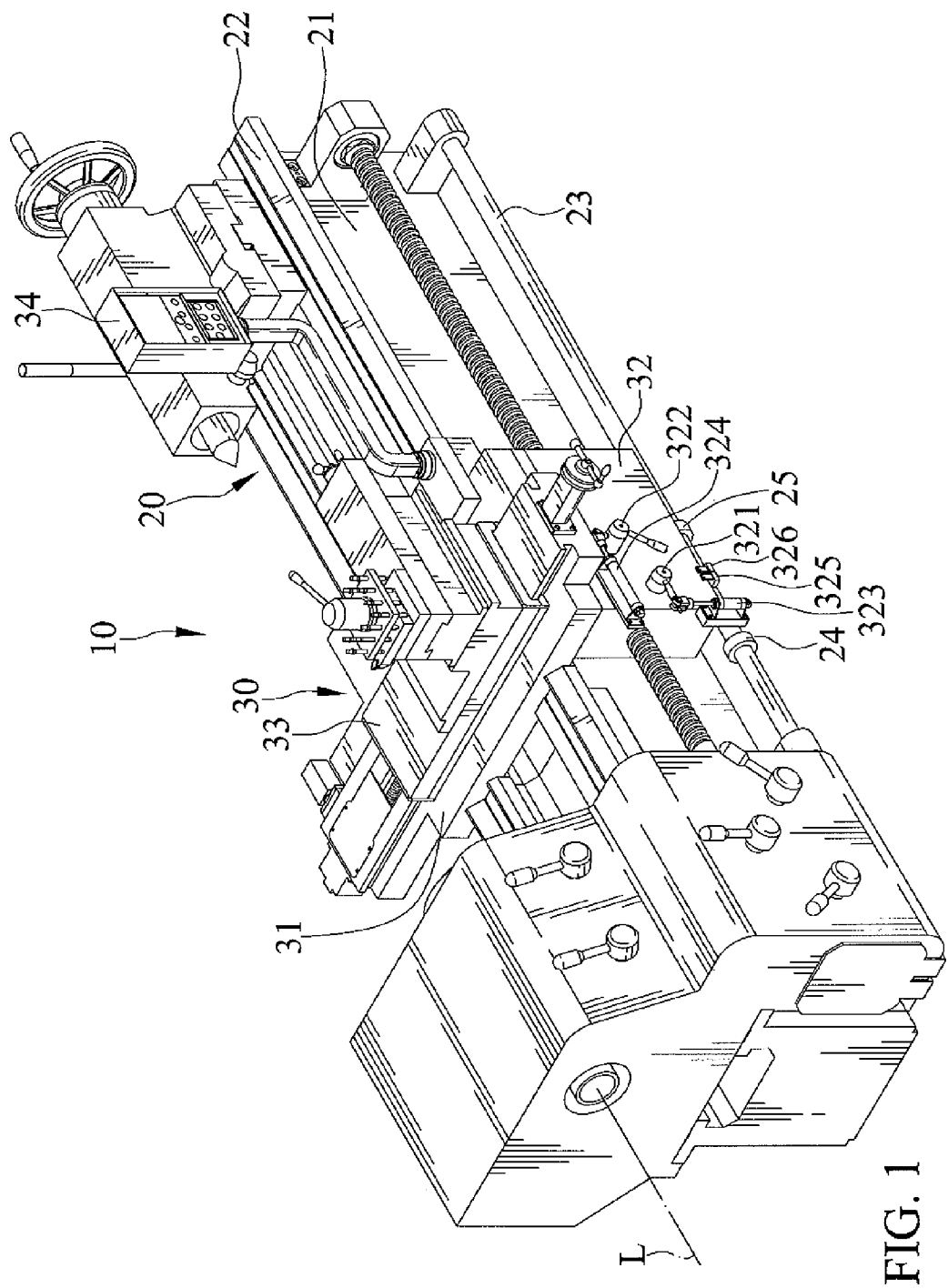
FIG. 1 is a perspective view of a lathe with automatic cross feeding and retraction functions according to the present invention.
Figure 2:
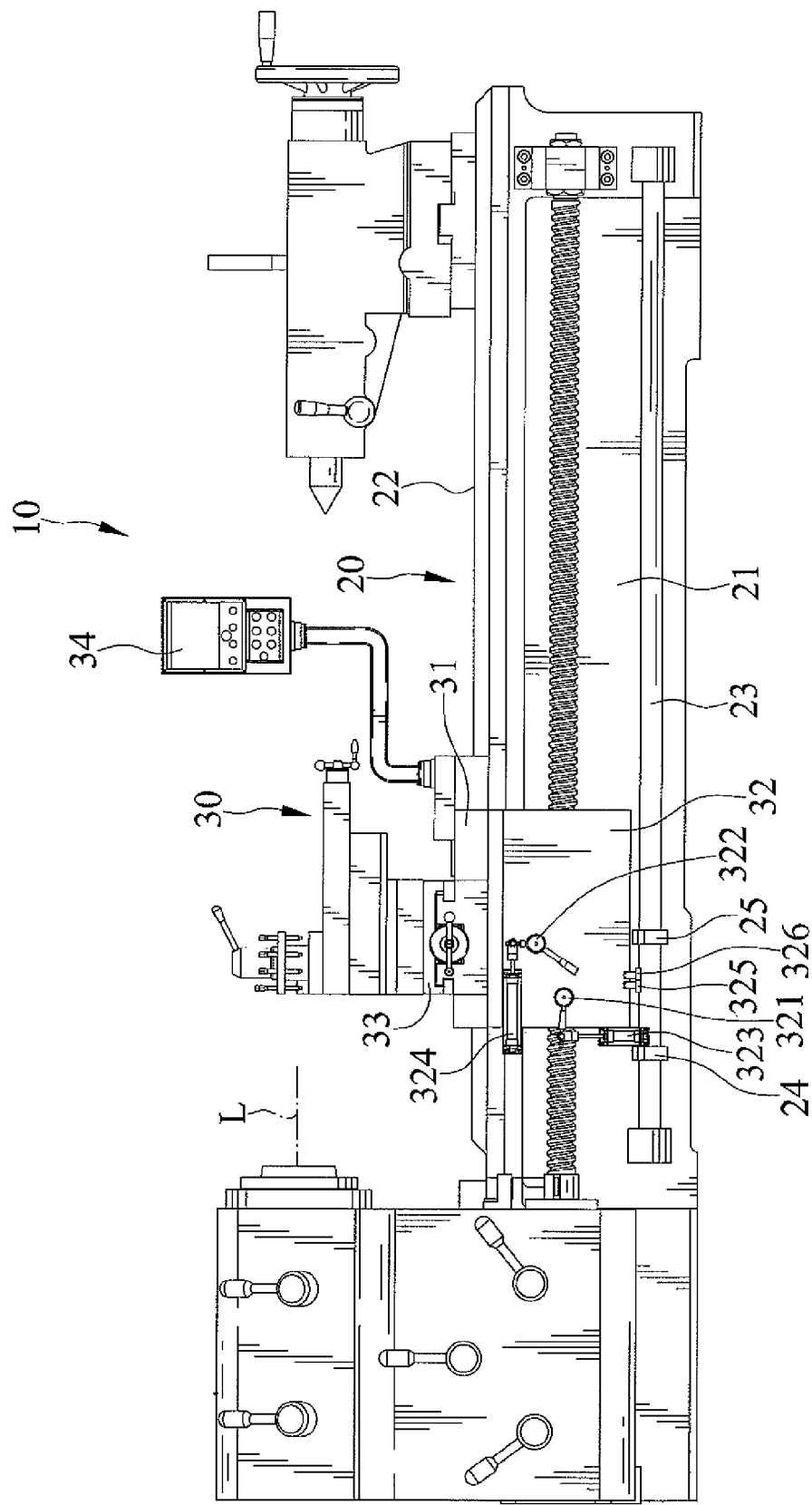
FIG. 2 is a front view of the lathe of FIG. 1.
Figure 3:
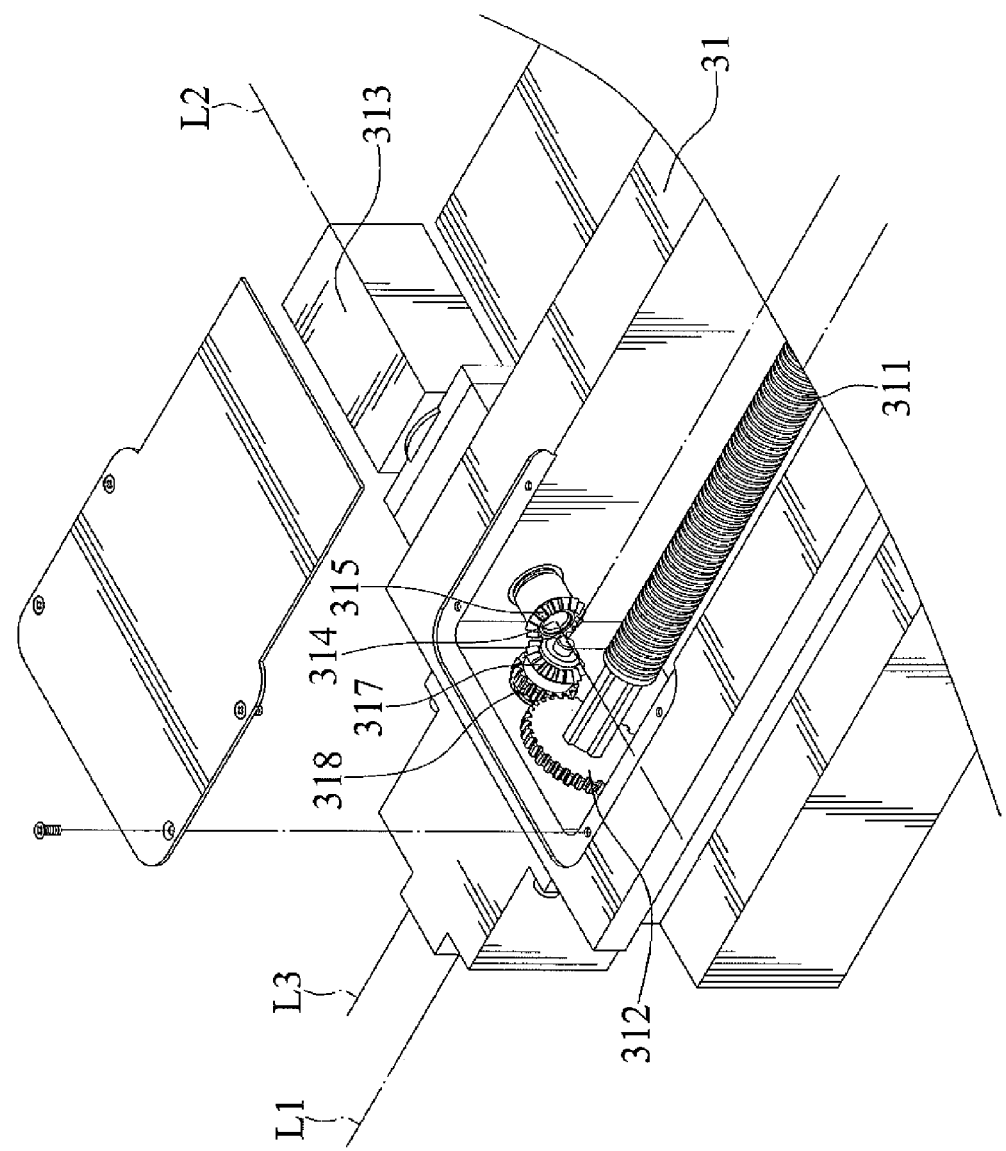
FIG. 3 is a partly exploded perspective view of a portion of the lathe of FIG. 1.
Figure 4:
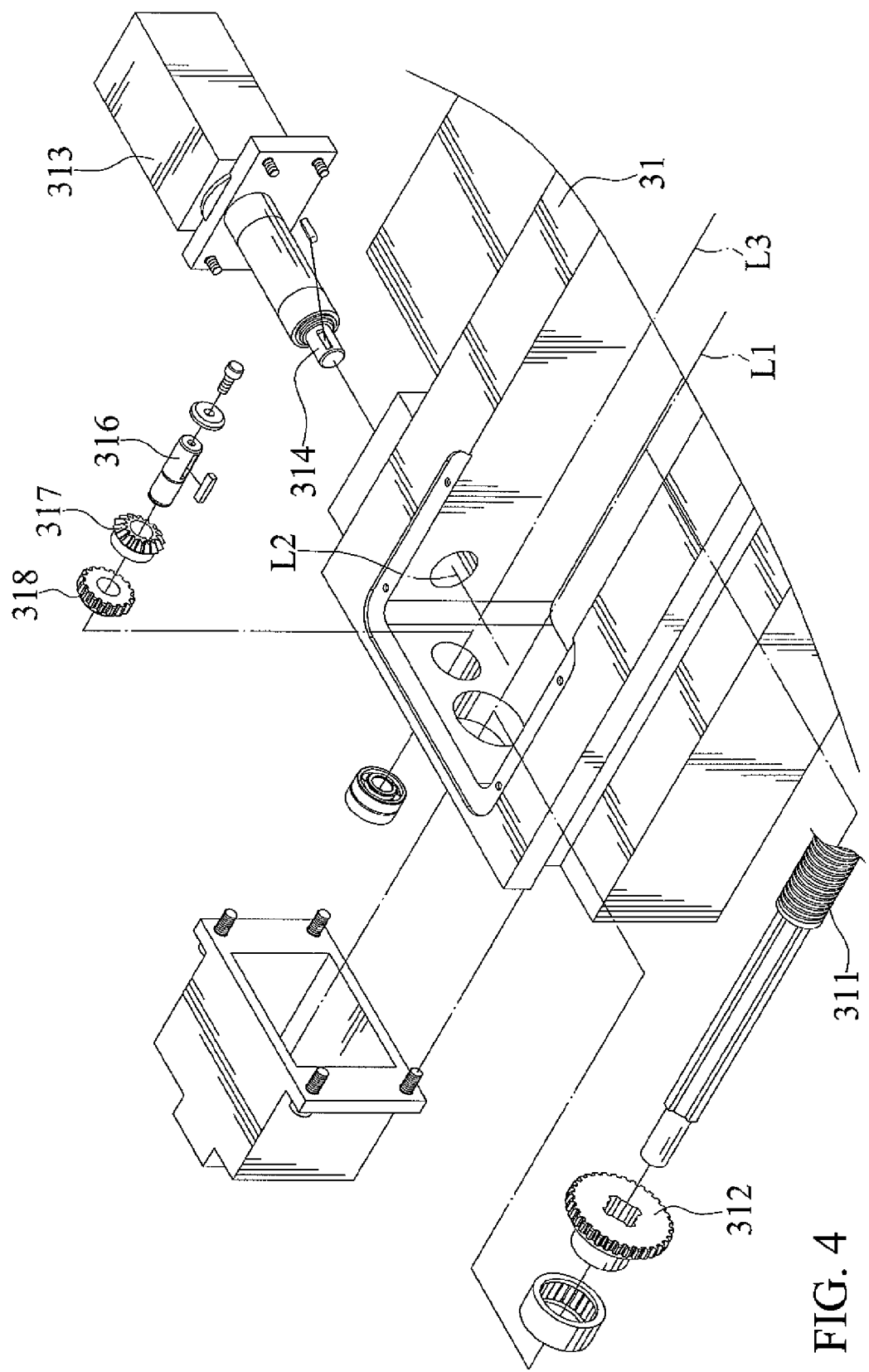
FIG. 4 is an exploded, perspective view of the portion of the lathe of FIG. 3.
Figure 5:
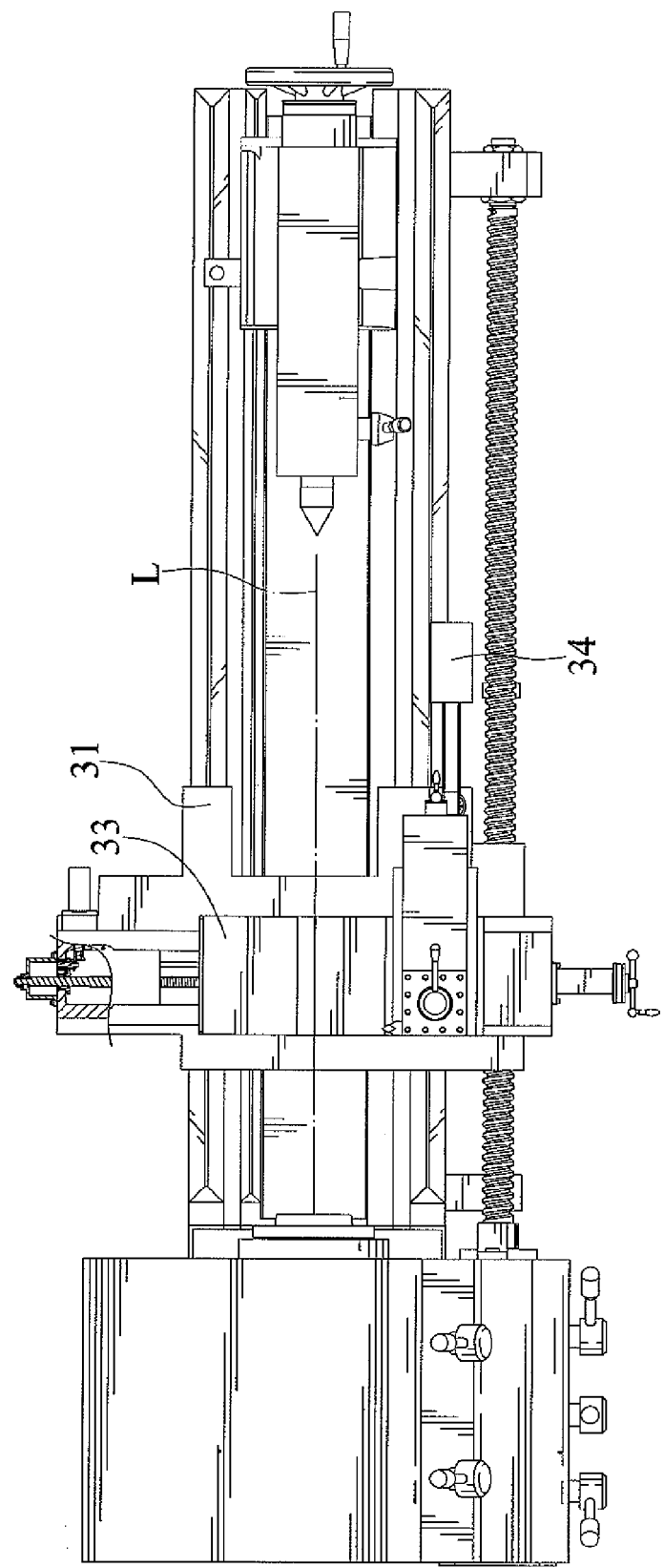
FIG. 5 is a top view of the lathe of FIG. 3, with a portion of the lathe cross sectioned.
Figure 6:
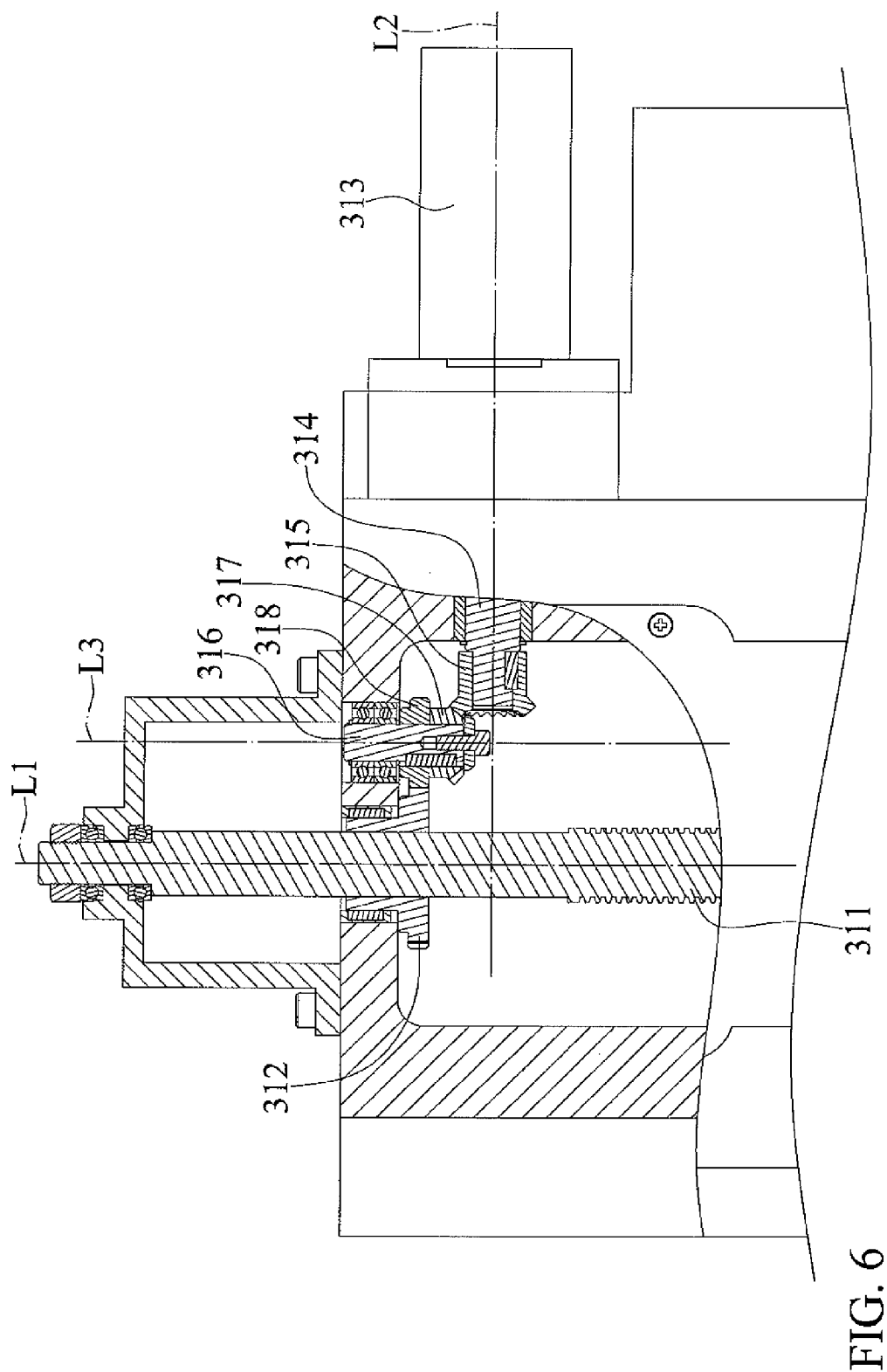
FIG. 6 is an enlarged view of a portion of the lathe of FIG. 5.
Figure 7:
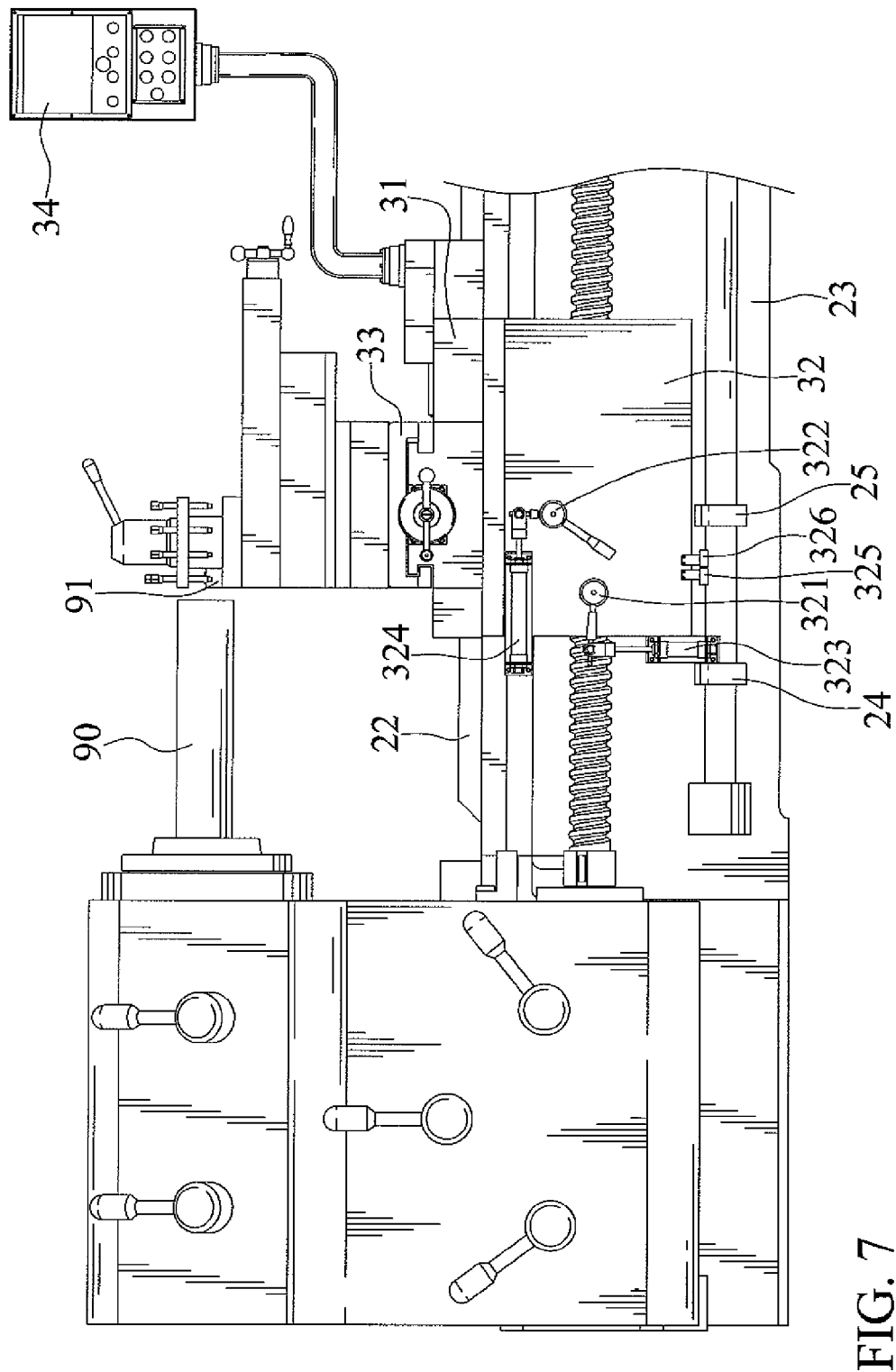
FIG. 7 shows a portion of the lathe of FIG. 2, with a workpiece held in place for processing.
Figure 8:
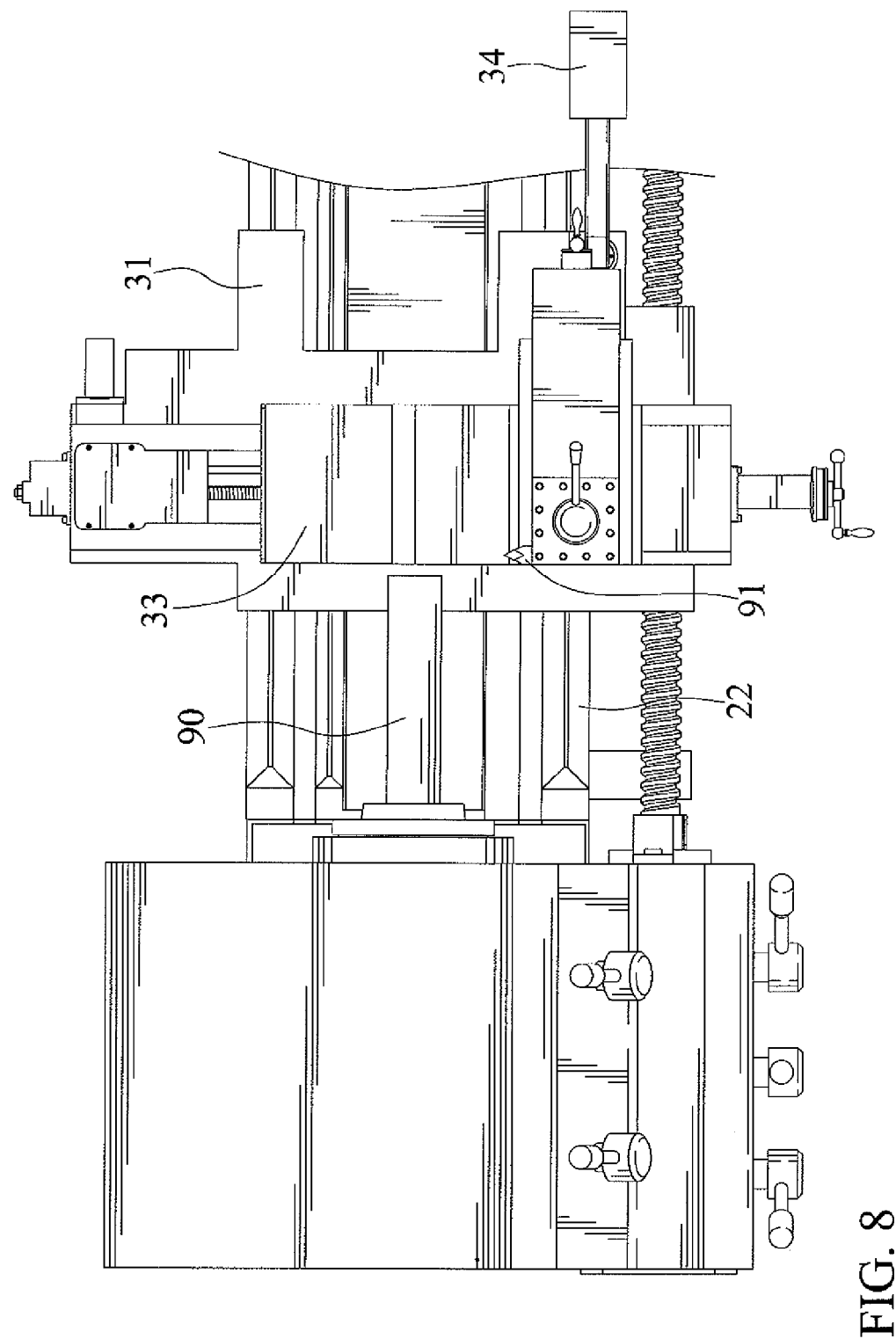
FIG. 8 is a top view of the lathe of FIG. 7.

With reference to FIGS. 1-6, a lathe 10 with automatic cross feeding and retraction functions according to the present invention includes a frame 20 and a carriage 30.

The frame 20 includes a base 21 and a bed 22. The bed 22 is mounted on a top face of the base 21 and extends along a rotational axis L of the lathe 10. A feed limit rod 23 is mounted to a front side of the base 21 and extends along the rotational axis L. The feed limit rod 23 includes a first stop 24 and a second block 25. The first stop 24 and the second stop 25 are movable relative to the feed limit rod 23 along the rotational axis L.

The carriage 30 includes a saddle 31, an apron 32, and a cross sliding board 33. The saddle 31 is movable on a top face of the bed 22 relative to the frame 20 along the rotational axis L. An apron 32 is connected to the saddle 31 and is located on the front side of the base 21. The cross sliding board 33 is movable on a top face of the saddle 31 relative to the saddle 31 in a transverse direction perpendicular to the rotational axis L.

A cross feed screw 311 is received in the saddle 31 and extends along a first rotating axis L1 that extends in the transverse direction. The cross feed screw 311 is rotatable relative to the saddle 31 about the first rotating axis L1 to drive the cross sliding board 33 to move in the transverse direction relative to the saddle 31. A driven gear 312 is mounted on and jointly rotatable with the cross feed screw 311. In this embodiment, the driven gear 312 is a spur gear.

The saddle 31 further includes a servo motor 313 extending along a second rotating axis L2 parallel to the rotational axis L. The servo motor 313 includes a driving shaft 314 extending along the second rotating axis L2. A driving gear 315 is mounted on and jointly rotatable with the driving shaft 314. The driving gear 315 is rotatable about the second rotating axis L2 to drive the driven gear 312 to rotate. In this embodiment, the driving gear 315 is a bevel gear.

The saddle 31 further includes a middle shaft 316 extending along a third rotating axis L3 parallel to the first rotating axis L1 and intersecting with the second rotating axis L2. First and second idle gears 317 and 318 are mounted on and jointly rotatable with the middle shaft 316. The first idle gear 317 meshes with the driving gear 315. The second idle gear 318 meshes with the driven gear 312. In this embodiment, the first idle gear 217 is a bevel gear, and the second idle gear 318 is a spur gear. Thus, the driving gear 315 can drive the driven gear 312 to rotate through transmission by the first idle gear 317 and the second idle gear 318.

A half-nuts lever 321 and an automatic feed control rod 322 are mounted to a side of the apron 32 opposite to the frame 20. The half-nuts lever 321 is connected to a first fluidic pressure device 323 configured for moving the half-nuts lever 321. The automatic feed control rod 322 is connected to a second fluidic pressure device 324 configured for moving the automatic feed control rod 322. In this embodiment, each of the first fluidic pressure device 323 and the second fluidic pressure device 324 is a pneumatic cylinder.

A first limit switch 325 and a second limit switch 326 are connected to the apron 32. The first limit switch 325 and the second limit switch 326 are located between the first stop 24 and the second stop 25.

The carriage 30 further includes a controller 34 fixed to the top face of the saddle 31. The controller 34 is electrically connected to the servo motor 313. The controller 34 can be operated to control the servo motor 313 to rotate or stop. The controller 34 is also electrically connected to the first fluidic pressure device 323, the second fluidic pressure device 324, the first limit switch 325, and the second limit switch 326.

With reference to FIGS. 7-10, when it is desired to use the late 10 to cut a workpiece 90, the controller 34 can be operated to drive the servo motor 313 to rotate the cross feed screw 311, moving the cross sliding board 33 to complete cross feed.

Figure 9:
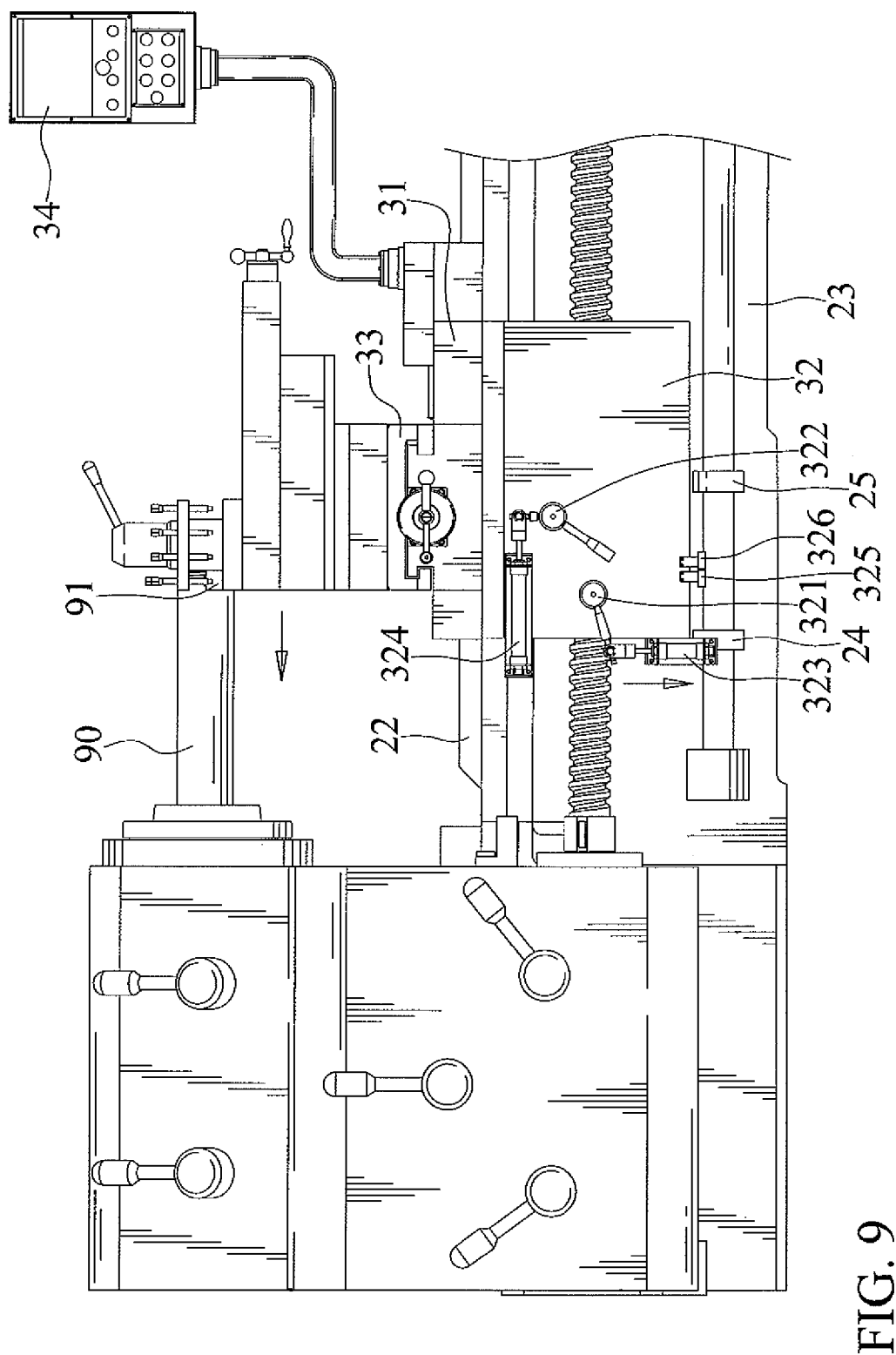
FIG. 9 is a view similar to FIG. 7, with a half-nuts lever moved to an engagement position.
Figure 10:
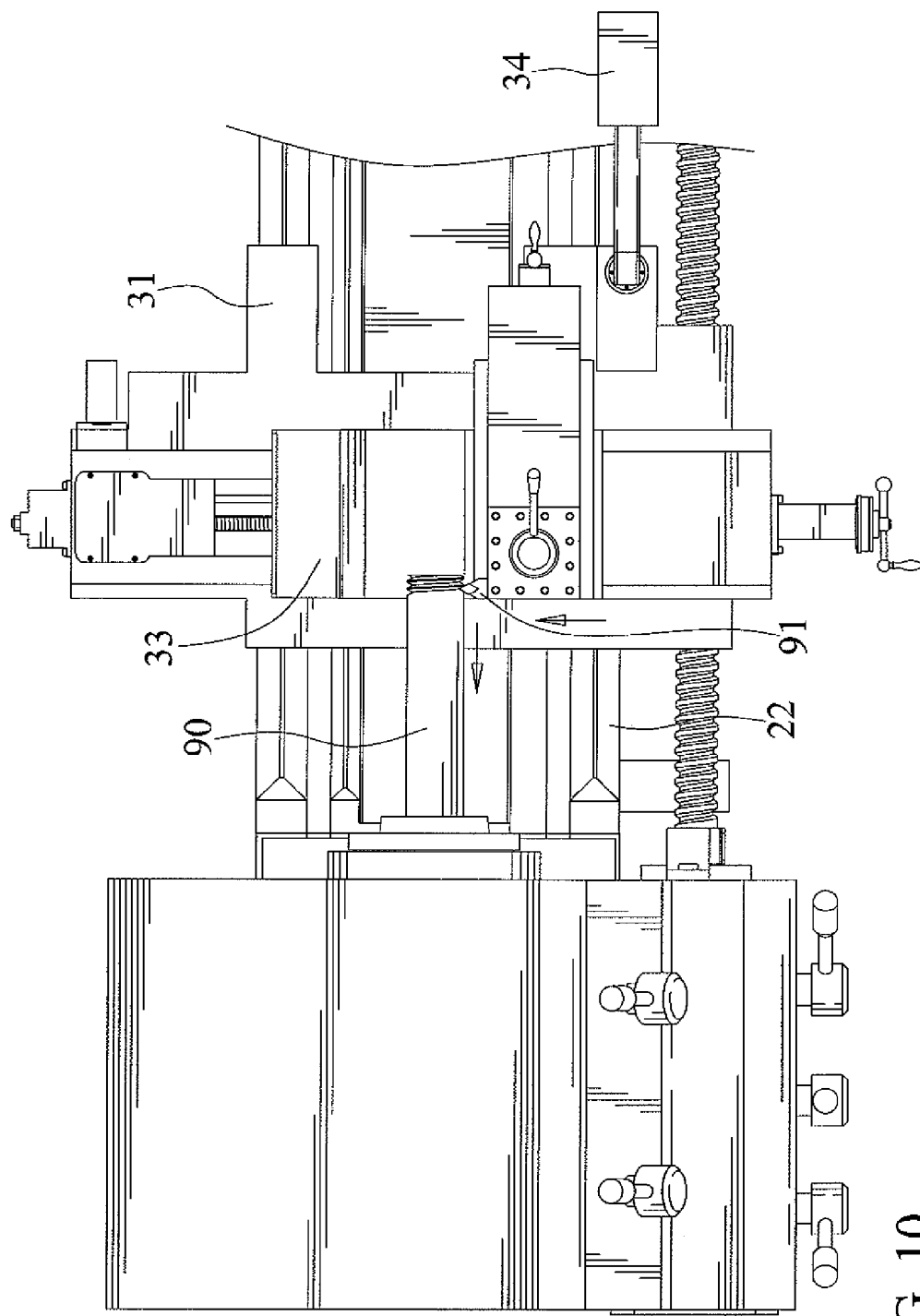
FIG. 10 is a view similar to FIG. 8, illustrating the cutting procedure.

When it is desired to proceed with thread cutting, the first stop 24 and the second stop 25 are firstly moved to an appropriate position to control the cutting travel. Control programs are installed into the controller 34 to control the thread cutting operation of the late 10. When the control programs are executed, the controller 34 activates the servo motor 313 to actuate the cross sliding board 33, moving the cutter 91 in the transverse direction. When the cutter 91 reaches the predetermined depth, the controller 34 stops the servo motor 313 and controls the first fluidic pressure device 323 to move the half-nuts lever 321 to an engagement position (FIG. 9). The saddle 31 moves towards the workpiece 90 along the rotating axis L, and the cutter 91 begins the thread cutting process (FIG. 10).

Figure 11:
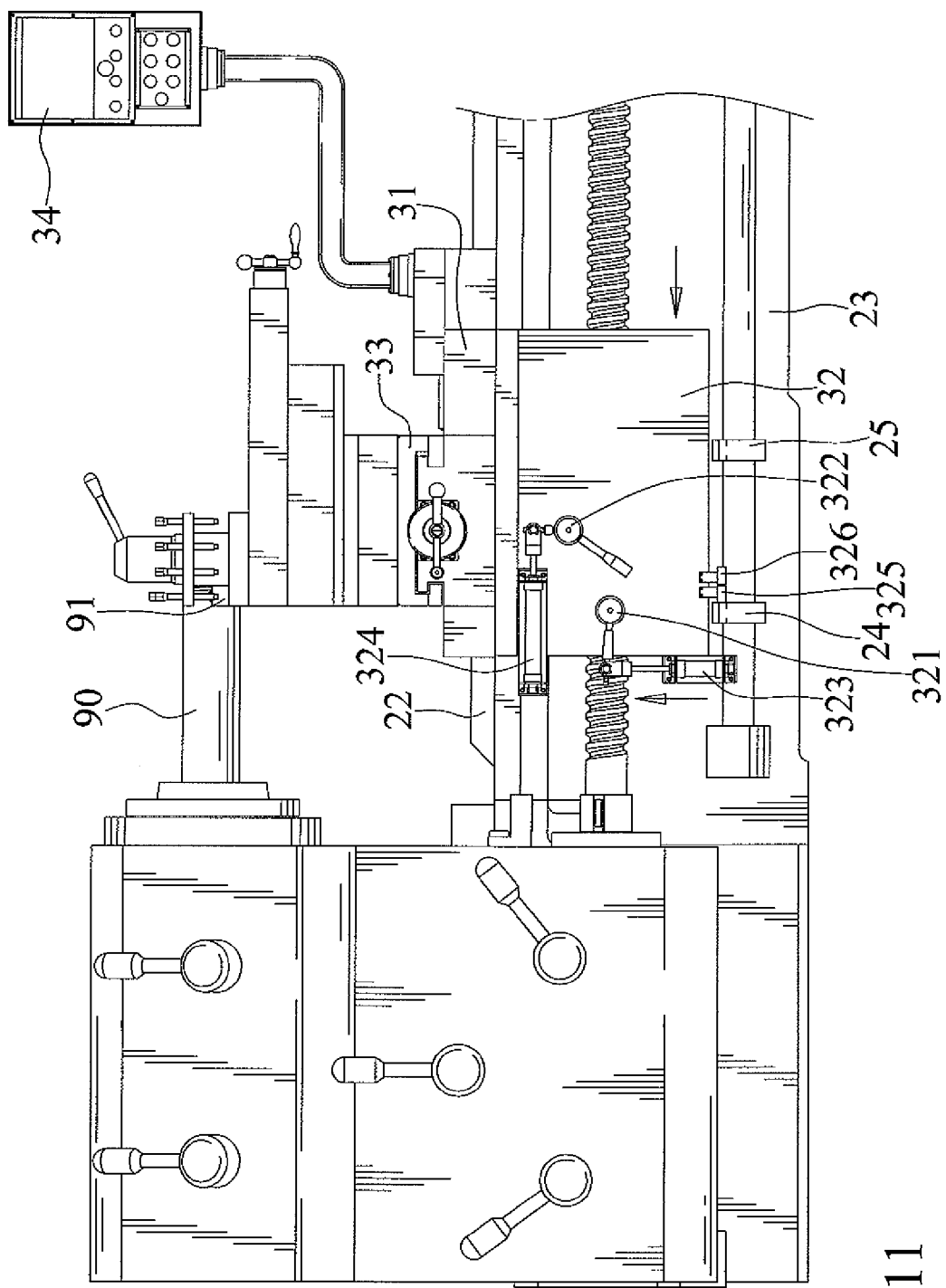
FIG. 11 is a view similar to FIG. 9, with the half-nuts lever moved to a release position.
Figure 12:
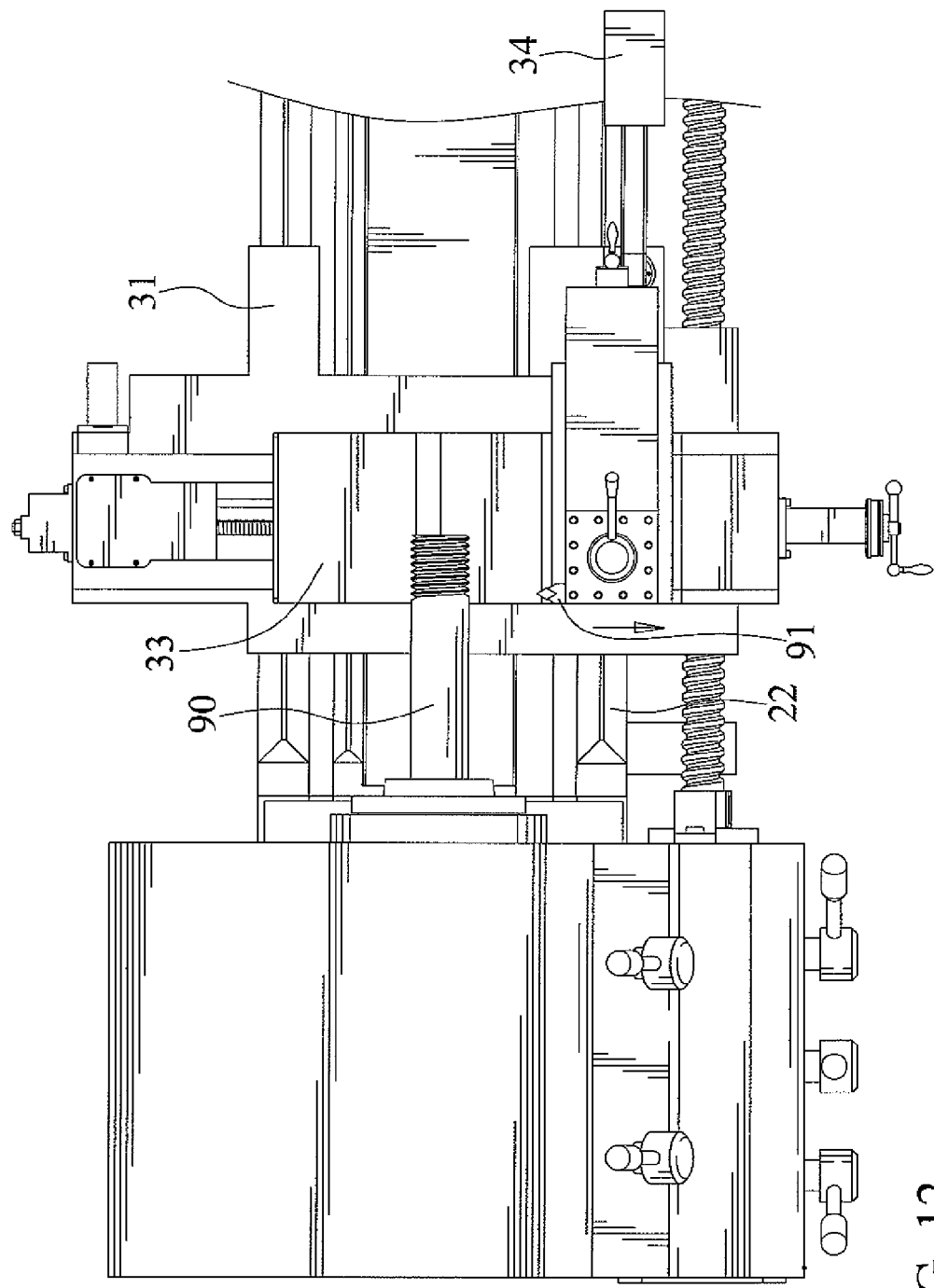
FIG. 12 is a view similar to FIG. 10, illustrating a cutter retraction procedure.
Figure 13:
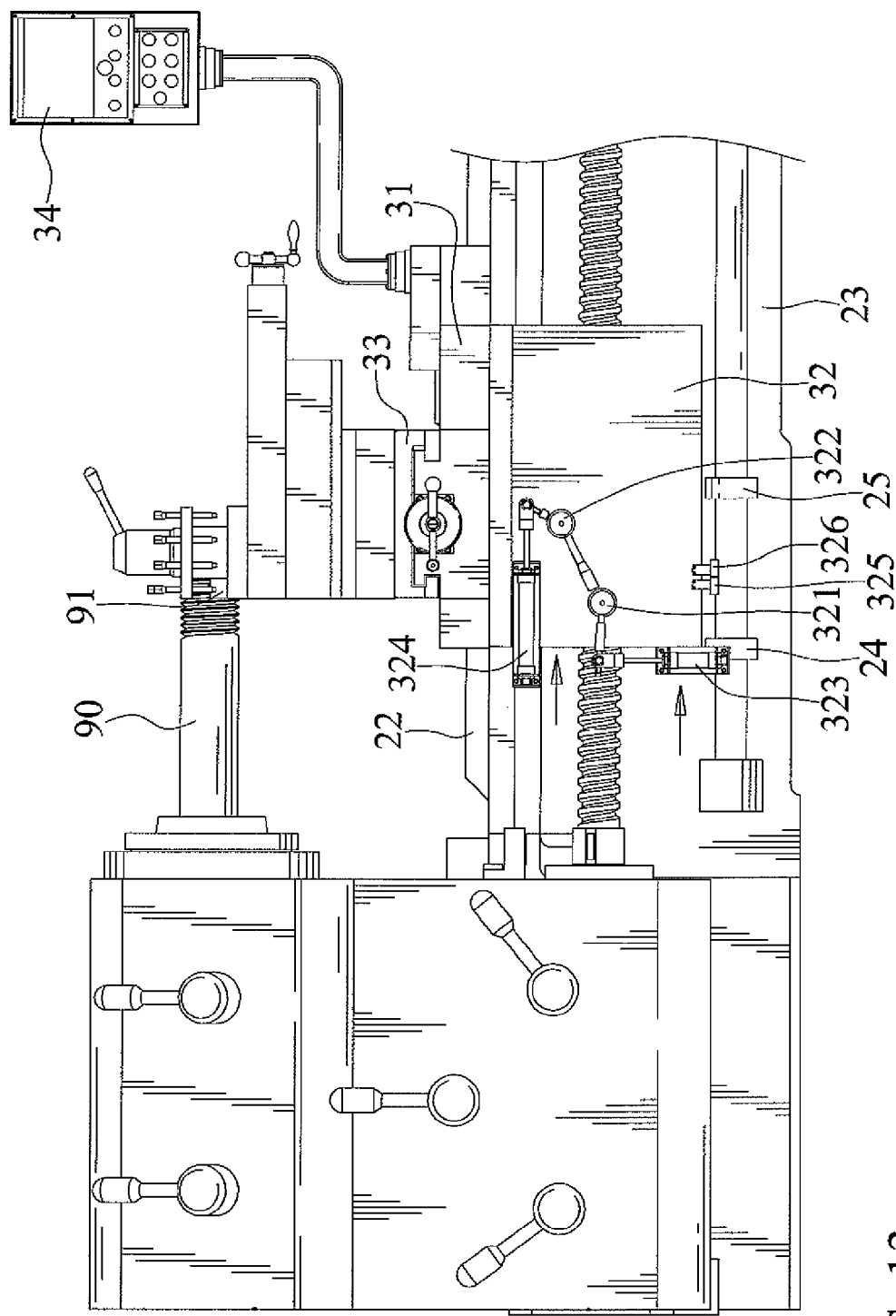
FIG. 13 is a view similar to FIG. 11, with an automatic feed control rod moved to a retracted position.

When the first limit switch 325 contacts with the first stop 24, the controller 34 controls the first fluidic pressure device 323 to move the half-nuts lever 321 to a release position (FIG. 11). Furthermore, the controller 34 activates the servo motor 313 to actuate the cross sliding board 33, retracting the cutter 91 (FIG. 12). After the cross sliding board 33 has been retracted to the predetermined position, the controller 34 controls the second fluidic pressure device 324 to move the automatic feed control rod 322 to a cutter retracting position. The saddle 31 moves away from the workpiece 90 along the rotating axis L (FIG. 13).

Figure 14:
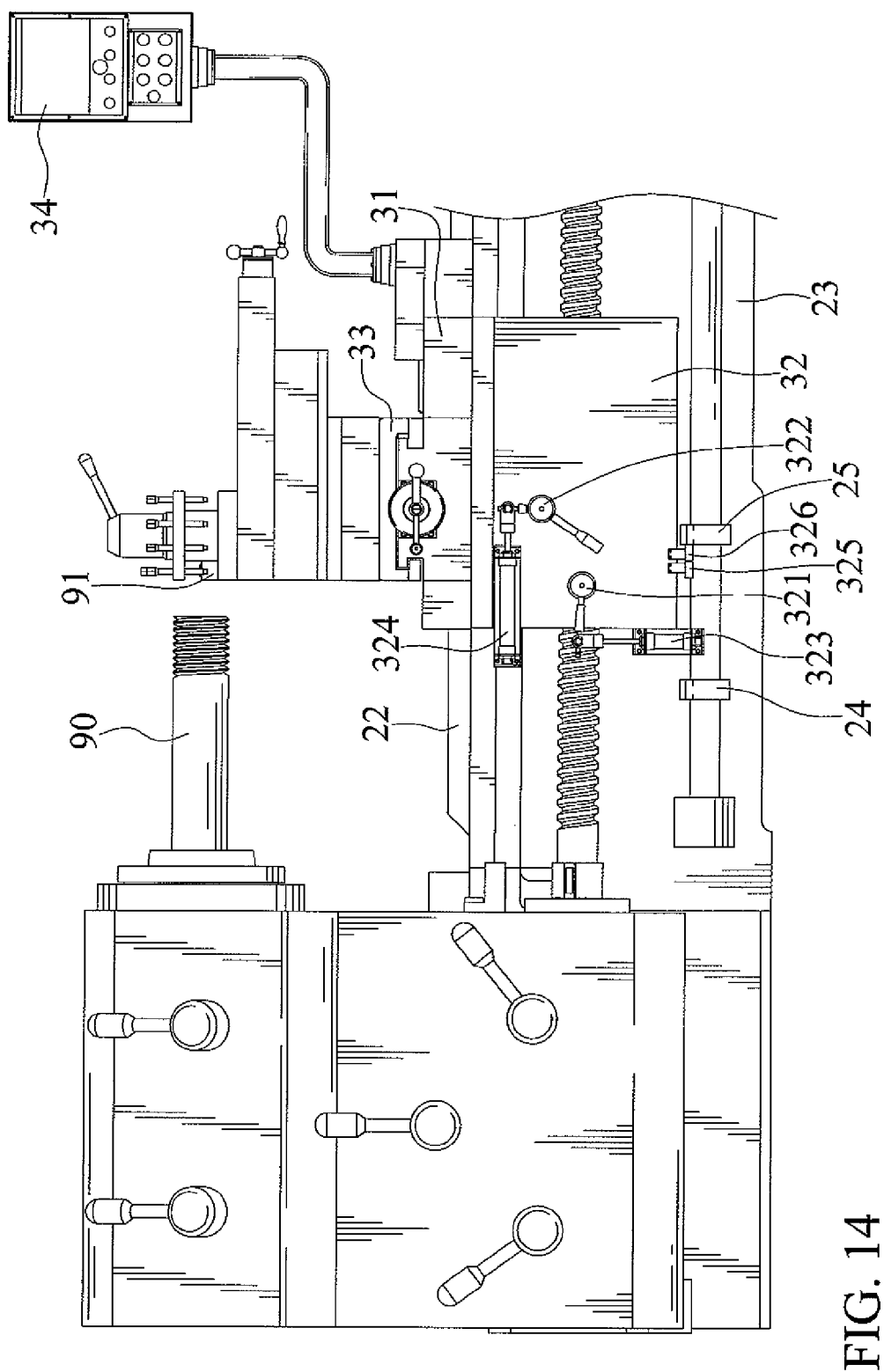
FIG. 14 is a view similar to FIG. 12, with the lathe returned to the original state.

When the second limit switch 326 contacts with the second stop 25, the controller 34 controls the second fluidic pressure device 324 to move the automatic feed control rod 322 to a free position. The saddle 31 stops, and the lathe 10 returns to its original state (FIG. 14). If the cutting has not been completed yet, the controller 34 restarts the servo motor 313 to actuate the cross sliding board 33, feeding the cutter 91 in the transverse direction. The procedures are repeated until the cutting is accomplished.

The lathe 10 uses the servo motor 313 to drive the cross feed screw 311 to rotate through transmission by the first idle gear 317 and the second idle gear 318, such that the lathe 10 can use programs to control the cross feed of the lathe 10 by using the controller 34, which is very convenient. Furthermore, the control system of the lathe 10 can be used in conventional lathes to provide the conventional lathes with program control.

Furthermore, the lathe 10 can cooperate with the first fluidic pressure device 323, the second fluidic pressure device 324, the first limit switch 325, and the second limit switch 326. After setting the controller 34, the lathe 10 can proceed with thread cutting operation until the thread is formed, providing an automatic thread cutting function.

Although specific embodiments have been illustrated and described, numerous modifications and variations are still possible without departing from the scope of the invention. The scope of the invention is limited by the accompanying claims.

The invention claimed is:

1. A lathe comprising:
a frame including a base and a bed, with the bed mounted on a top face of the base, and with the bed extending along a rotational axis of the lathe;
a carriage including a saddle and a cross sliding board, with the saddle movable on a top face of the bed relative to the frame along the rotational axis, with the cross sliding board movable on a top face of the saddle relative to the saddle in a transverse direction perpendicular to the rotational axis, with a cross feed screw received in the saddle and extending along a first rotating axis that extends in the transverse direction, with the cross feed screw rotatable relative to the saddle about the first rotating axis to drive the cross sliding board to move in the transverse direction relative to the saddle, with a driven gear mounted on and jointly rotatable with the cross feed screw, with the saddle further including a servo motor extending along a second rotating axis, with the servo motor including a driving shaft extending along the second rotating axis, with a driving gear mounted on and jointly rotatable with the driving shaft, with the driving gear rotatable about the second rotating axis to drive the driven gear to rotate, with the carriage including a controller electrically connected to the servo motor, and with the controller operable to control the servo motor to rotate or stop.

2. The lathe as claimed in claim 1, with the saddle further including a middle shaft extending along a third rotating axis, with first and second idle gears mounted on and jointly rotatable with the middle shaft, with the first idle gear meshed with the driving gear, with the second idle gear meshed with the driven gear, and with the driving gear driving the driven gear to rotate through transmission by the first idle gear and the second idle gear.

3. The lathe as claimed in claim 2, with the second rotating axis parallel to the rotational axis, with the third rotating axis parallel to the first rotating axis and intersecting with the second rotating axis, with the driven gear being a spur gear, with the driving gear being a bevel gear, with the first idle gear being a bevel gear, and with the second idle gear being a spur gear.

4. The lathe as claimed in claim 1, with the carriage including an apron connected to the saddle, with the apron located on a front side of the base, with a half-nuts lever and an automatic feed control rod mounted to a side of the apron opposite to the frame, with the half-nuts lever connected to a first fluidic pressure device configured for moving the half-nuts lever, with the automatic feed control rod connected to a second fluidic pressure device configured for moving the automatic feed control rod, and with the controller electrically connected to the first fluidic pressure device and the second fluidic pressure device.

5. The lathe as claimed in claim 4, further comprising a feed limit rod mounted to the front side of the base and extending along the rotational axis, with the feed limit rod including a first stop and a second block, with the first stop and the second stop movable relative to the feed limit rod along the rotational axis, with a first limit switch and a second limit switch connected to the apron, with the first limit switch and the second limit switch located between the first stop and the second stop, and with the controller electrically connected to the first limit switch and the second limit switch.

6. The lathe as claimed in claim 5, wherein each of the first fluidic pressure device and the second fluidic pressure device is a pneumatic cylinder.

7. The lathe as claimed in claim 6, wherein the controller is fixed to the top face of the saddle.

* * * * *